United States Patent
Zinsmeister et al.

(10) Patent No.: US 6,672,655 B2
(45) Date of Patent: Jan. 6, 2004

(54) ROOF MODULE

(75) Inventors: Arnulf Zinsmeister, Mömbris (DE); Daniel Hock, Johannesberg (DE)

(73) Assignee: ArvinMeritor GmbH, Dietzenbach (DE)

( * ) Notice: Subject to any disclaimer, the term of this patent is extended or adjusted under 35 U.S.C. 154(b) by 0 days.

(21) Appl. No.: 10/192,237

(22) Filed: Jul. 10, 2002

(65) Prior Publication Data

US 2003/0011213 A1 Jan. 16, 2003

(30) Foreign Application Priority Data

Jul. 12, 2001 (DE) .......................................... 101 33 894

(51) Int. Cl.$^7$ ................................................ B60J 7/02
(52) U.S. Cl. .................. 296/210; 296/216.01; 296/216; 296/191
(58) Field of Search ................................ 296/210, 214, 296/216.01, 216.04, 216.09, 216.06, 218, 191, 193, 185

(56) References Cited

U.S. PATENT DOCUMENTS

| | | | | |
|---|---|---|---|---|
| 5,545,261 A | * | 8/1996 | Ganz et al. .................. 296/215 |
| 6,036,259 A | * | 3/2000 | Hertel et al. ........... 296/216.01 |
| 6,155,635 A | * | 12/2000 | Wecker ....................... 296/211 |
| 6,254,176 B1 | * | 7/2001 | Hare .......................... 296/211 |
| 6,423,894 B1 | * | 7/2002 | Patz et al. .................. 296/210 |
| 6,517,147 B2 | * | 2/2003 | Grimm ........................ 296/210 |
| 6,517,148 B1 | * | 2/2003 | Teschner et al. ............. 296/211 |
| 6,550,852 B2 | * | 4/2003 | Patz et al. ................... 296/211 |
| 6,557,925 B2 | * | 5/2003 | Odashima et al. ........ 296/146.7 |
| 6,582,013 B1 | * | 6/2003 | Inoue et al. ................. 296/214 |
| 6,588,833 B2 | * | 7/2003 | Strommer et al. .......... 296/214 |
| 2001/0003400 A1 | | 6/2001 | Grimm et al. |

FOREIGN PATENT DOCUMENTS

DE            2128318           12/1972

OTHER PUBLICATIONS

European Search Report mailed May 22, 2003.

* cited by examiner

*Primary Examiner*—Stephen T. Gordon
*Assistant Examiner*—Greg Blankenship
(74) *Attorney, Agent, or Firm*—Carlson, Gaskey & Olds (57) ABSTRACT

A module for mounting on a vehicle body and closing an outer skin of the vehicle body comprises at least one part made of metal that in an installed state of the module forms at least a portion of the outer skin. The module further comprises a plastic layer which is connected with the metal part and with which the module rests at the vehicle body. An electrically conductive contact element is provided that is connected with the metal part in an electrically conductive manner and is attached to the plastic layer. The contact element has an exposed section with regard to the plastic layer, the exposed section serving for making electrical contact with the vehicle body. There is further proposed a method of producing such a module.

21 Claims, 6 Drawing Sheets

ROOF MODULE

This application claims priority to German Patent Application Serial No. 101 33 894.5 filed on Jul. 12, 2001.

TECHNICAL FIELD

The invention relates to a module for mounting on a vehicle body and closing an outer skin of the vehicle body. The invention relates in particular to a roof module including an integrated roof opening system.

BACKGROUND OF THE INVENTION

Known modules for mounting on vehicle bodies comprise at least one part made of metal that in an installed state of the module forms at least a portion of the outer skin and a plastic layer which is connected with the metal part and with which the module rests at the vehicle body. Prior to being equipped with modules, the vehicle body, i.e., the sheet metal structure of the vehicle, has openings in the outer skin which are closed by means of the inserted modules. Examples of such modules for closing an opening in the outer skin of the vehicle are movable modules such as doors, engine hood, trunk lid, and modules stationary with respect to the outer skin, such as front end modules or (upon which the invention particularly aims at) roof modules, especially those including an integrated roof opening system. Such roof modules may be, for instance, sliding roof modules or spoiler roof modules as well as folding roof modules or roof modules with a solid glass roof, i.e. complete modules that are inserted in an opening in the vehicle body. There are variants of roof modules in which the roof module rests at the vehicle body via the electrically insulating plastic layer and, with this, is electrically insulated with respect to the remainder of the bodywork. The invention relates to modules that are mounted on the vehicle body in such a manner. Quite frequently, add-on components such as antennas or the like are optionally to be fastened to the part that forms the outer skin, where aground contact must be established. In fact, there are solutions available, e.g., in the case of an engine hood to weld a ground wire to the sheet metal itself, to fix it by brazing or by means of a screw which is welded to the engine hood. Such a solution, however, has always the disadvantage that assembly is very time consuming, that perhaps the outer skin or the lacquer is scratched and that the ground wire is possibly not exactly positioned in the installed state.

SUMMARY OF THE INVENTION

The invention provides a module in which the part of metal that forms the outer skin can be brought into contact with the vehicle body in a simple manner.

This is achieved in a module which comprises at least one part made of metal that in an installed state of the module forms at least a portion of the outer skin. The module further comprises a plastic layer which is connected with the metal part and with which the module rests at the vehicle body. An electrically conductive contact element is provided that is connected with the metal part in an electrically conductive manner and is attached to the plastic layer. The contact element has an exposed section with regard to the plastic layer, the exposed section serving for making electrical contact with the vehicle body. In the module proposed, an electrically contact element that serves for making electrical contact with the metal part, is fastened to the plastic layer. The contact element can be fastened and positioned in the plastic layer very easily, by gluing, foaming or injection-molding. With this, the position of the contact element can be readily predefined. Due to the fact that the plastic layer is connected with the part, the contact element can be guided on or in the plastic layer as far as to the part, so that in the contact region of contact element and part a relative movement between the contact element and the part can be prevented. Further, fasteners such as screws or the like between the part and the contact element can thereby even be dispensed with. Moreover, with respect to the plastic layer, the contact element is exposed in sections, so that simultaneously with mounting the module on the vehicle body the contact between the exposed section of the contact element and the vehicle body can be made. Thereby, additional fasteners that are used only for making contact may possibly be fully dispensed with, where appropriate.

Preferably, the part is a sheet metal that closes an opening in the outer skin of the vehicle body or is a frame supporting the module, so that the part is a supporting part.

As mentioned, the module of the invention is according to the preferred embodiment a roof module including an integrated roof opening system. Such a roof module may be, for example, the complete roof fastened to the frame of the vehicle body, or a sliding roof module or spoiler roof module only.

The part is, for example, a frame surrounding the roof module opening.

In case that the contact element is configured to be mechanically not load carrying, for instance as a flexible cable, and/or is integrated in the module so as to be mechanically not load-carrying, the loads on the contact element are low which enhances the contact reliability.

Preferably, there may be provided an electrically conductive glued connection as connection between the contact element and the part or the vehicle body. However, other types of connecting such as welding, riveting, crimping, clinching, providing an electrical plug-in contact or connecting by means of screwing or clamping are also possible.

In the preferred embodiment there is provided a fastening device for fastening the module to the vehicle body. Such fastening device may be a glued connection, a riveted connection, a crimped or clinched connection, a plug-in connection or a connection by means of screwing or clamping.

Additional components may be dispensed with if the fastening device for fastening the module to the vehicle body simultaneously serves for the electrically conductive fastening of the contact element to the vehicle body. Moreover, there is simultaneously achieved in one working step, namely during fastening the module to the vehicle body, that through the contact element contact is made between part and vehicle body.

One of these fastening devices may be an electrically conductive glued connection by means of which the contact element is directly attached to the vehicle body.

There is further provided that the part is provided with a foamed backing on its underside in order to form the plastic layer. Through providing of the foamed backing, it is also possible to integrate the contact element in the module and to embed it in the plastic layer in one working step.

By using an electrically conductive contact strip or a flat cable as contact element, it is possible to make available a large contact surface area both for the part and the vehicle body.

In case that the flat cable is exposed on the outer side of the plastic layer, to which it is fastened, then this exposed section which is securely held on the plastic layer is available for contacting the vehicle body.

The advantage of using a flat cable is, among others, that it simply can be connected at one end with a plug that serves for connecting an electrical consumer provided on the module, for instance an interior lighting or a drive motor.

Through embedding the flat cable in an undulated or zigzag-like manner in the plastic layer, it is possible to securely and positively integrate the flat cable in the plastic layer in a strain-relieved manner.

The invention further relates to a method of producing a module according to the invention, in particular a roof module with integrated roof opening system, and here preferably the production of a sliding roof module or spoiler roof module. The method according to the invention is characterized by the following steps:

a) the part is placed in a foaming mold;
b) the contact element is placed in the foaming mold and is positioned relative to the part, and
c) the part is provided with a foamed backing in such a way that the contact element is embedded in the plastic layer which is produced, the contact element contacting the part in a state when the foamed backing is complete.

Through the method according to the invention, the contact element is reliably positioned in the plastic layer and, hence, firmly in relation to the part. A tearing out of the contact element or a loosening of the contact can be prevented relatively safe. Further, no separate component is required for fastening the contact element to the plastic layer. Making contact between contact element and part is done preferably already before it being placed in the foaming mold.

Preferably prior to step c) and, if appropriate, even prior to step a), the electrical contact element is fastened to the part by means of an electrically conductive glued connection and is connected therewith in an electrically conductive manner. This electrically conductive glued connection is then encapsulated by the foaming process and is additionally safeguarded.

During foaming, the contact element, which preferably is a flat cable, may project with one end from the foaming mold, the contact element at a later point in time being connected with this free end e.g. to the vehicle body, or guided to a consumer provided on the module, and/or connected with the vehicle body for making contact therewith, if appropriate.

Finally, the present invention relates to a method of fastening a module according to the invention to a vehicle body, in particular of fastening a roof module, including an integrated roof opening system, to the vehicle body, the plastic layer having been produced by means of foaming. According to the invention it is provided for that the module contacts the vehicle body only in the region of the plastic layer and that by means of a fastening device the plastic layer is fastened to the vehicle body and the entire module is fastened via the plastic layer to the vehicle body, the electrical contact element also being connected in an electrically conductive manner to the vehicle body by the same fastening device.

This fastening device preferably is an electrically conductive glued connection, the gluing agent extending both across the plastic layer and the contact element which is exposed at least in part, in order to ensure a good and safe connection and a reliable electrical contact between the contact element and the vehicle body.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figures 1, 2:
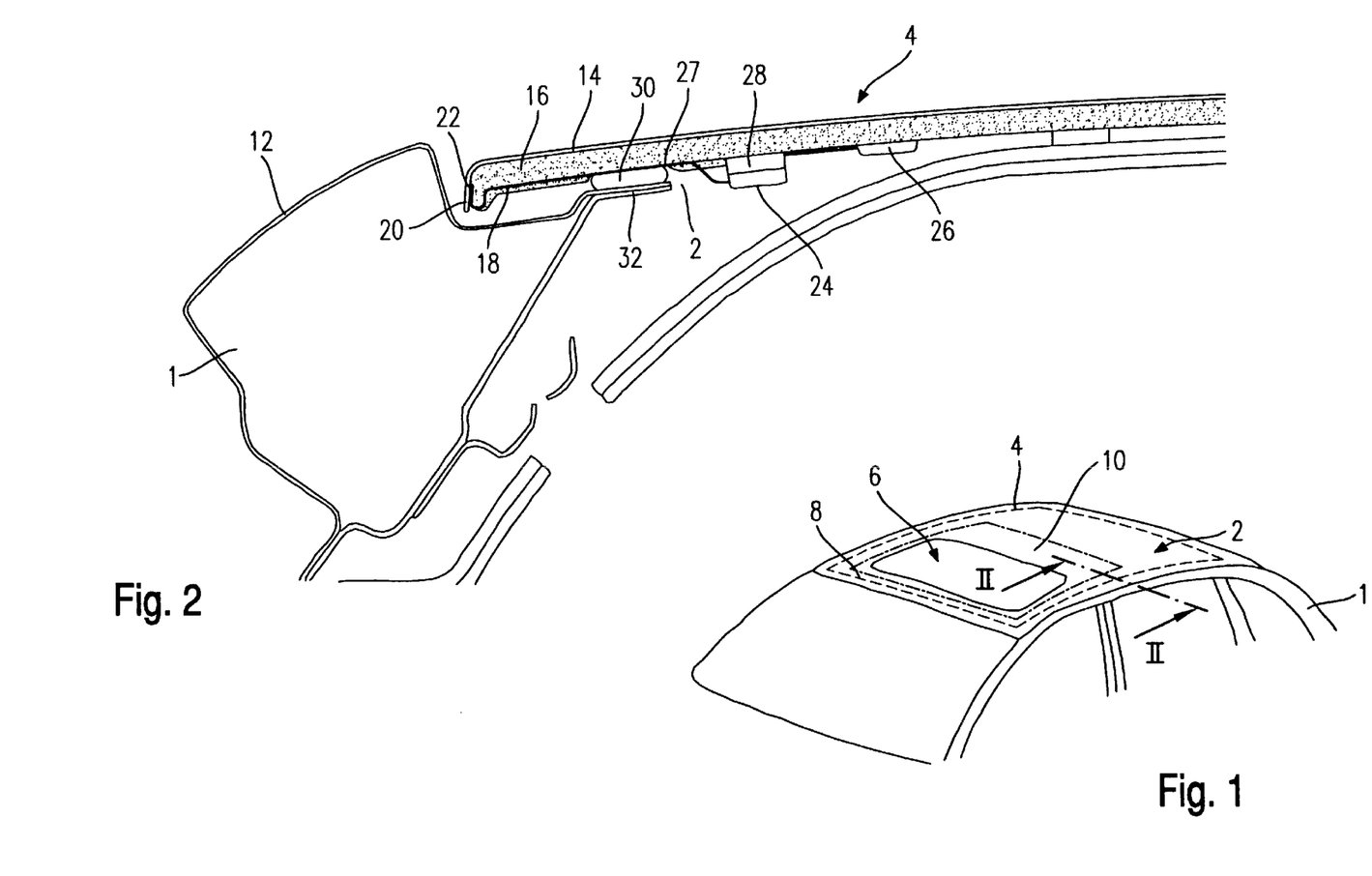
FIG. 1 is a perspective view of a vehicle body complete with an installed module according to the invention, in the form of a roof module.
FIG. 2 shows a section taken along line II—II through the edge of the roof module and the adjoining vehicle body.

In FIG. 1 there is shown a vehicle body 1 made of sheet metal with a vehicle roof that has an opening 2 (illustrated in broken lines) in the outer skin of the vehicle body 1. Installed in this opening 2 is a complete roof module 4 for closing the opening 2. Integrated in the roof module 4 is a roof opening system which an adjustable and/or a shiftable cover 6 for closing a roof module opening 8. Fresh air can be guided into the vehicle via the opened cover 6. As an alternative to this, the invention may also relate to a sliding or spoiler roof module, a folding, a lamella or a glass roof module, which in this case will not have the dimension of the roof module 4, but only would assume the dimension indicated with dot and dash lines, with the opening 2 being configured correspondingly smaller. The sliding or spoiler roof module is provided with reference numeral 10.

In FIG. 2 there is to be seen more clearly the vehicle body 1 with its outer skin 12 which is visible from the outside in the fully assembled state of the vehicle. The roof module 4 includes a part which consists of a sheet metal 14 that continues the outer skin 12 of the vehicle body 1 in the installed state and, with this, in sections forms part of the outer skin of the vehicle, as well as of a plastic layer 16 which immediately adjoins the inner side of the sheet metal 14 and is provided on sheet metal 14 by foaming or injection-molding. In order to make an electrically conductive contact between the sheet metal 14, i.e. the part, and the vehicle body 1, there is provided an electrically conductive contact element 18 in the form of a cable, preferably a flat cable. The flat cable is embedded in the plastic layer 16 where it is partially surrounded on all sides by plastic material. The contact element 18 is fastened to a bent-off edge 20 of sheet metal 14 by an electrically conductive, one- or two-component glued connection 22, the latter also establishing the electrical contacting of the contact element 18 with the sheet metal 14. Starting from the free end of the contact element 18, which is fastened to the sheet metal 14, the contact element firstly extends in an undulated shape through the plastic layer 16, in order to achieve a strain relief as close as possible to the free end fastened to edge 20. The contact element 18 is configured to be mechanically not load-carrying, because flexible, and is integrated in the roof module 4 in a not load-carrying manner, i.e., it serving exclusively for making electrical contact.

On a free end of the contact element 18, which is not fastened to the sheet metal 14, there is fastened an electrical plug contact 24 which closes an electric circuit of an electrical consumer provided on the roof module 4, e.g. an interior lighting 26. A mutual plug for the plug contact 24 is referenced by 28.

Between the two free ends of the contact element 18, the latter extends across a short section 27 on the outer side of the plastic layer 16. The contact element 18 is exposed in this section 27. In case there is used a flat cable, the insulation is stripped off the latter in this section 27.

The roof module 4 is fastened to the vehicle body 1 by means of a ring-like, as much as continuously surrounding glued connection 30, to be more precise to the sheet metal rim 32 of the vehicle body 1 bordering the opening 2. The gluing agent bead illustrated also extends across the exposed section of contact element 18. As the glued connection 30 likewise is an electrically conductive, one- or two-component glued connection, it also provides for an electrically conductive connection of contact element 18 and vehicle body 1. The glued connection 30 thus constitutes a fastening device for fastening the roof module 4 to the vehicle body 1, which fastening device has a dual function insofar as it at the same time also fastens the contact element 18 to the vehicle body in an electrically conductive manner.

In the embodiment illustrated in FIG. 2, the sheet metal 14 is at the same time a supporting frame for the cover 6 that can not be seen in FIG. 2.

Figure 3:
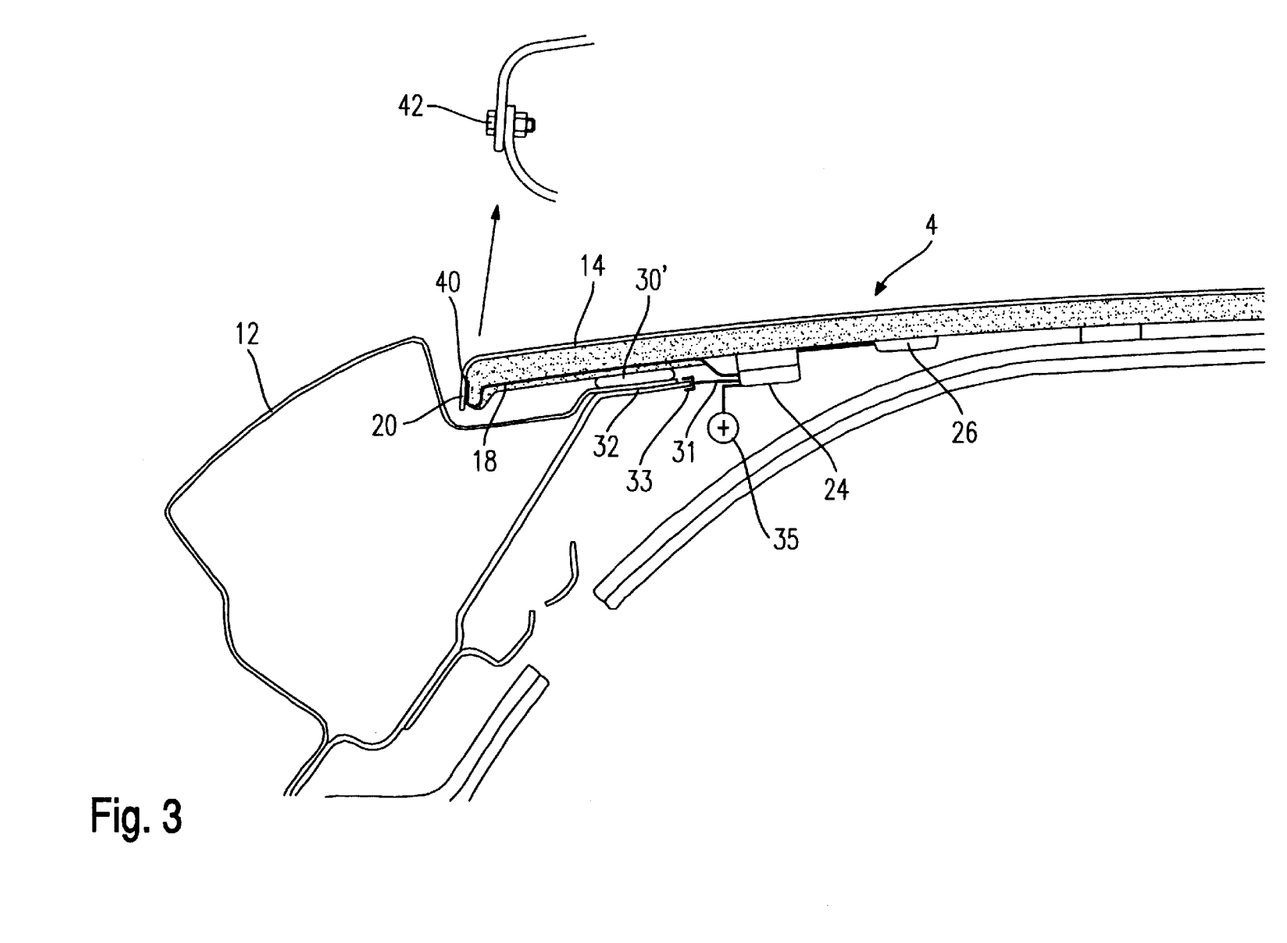
FIG. 3 shows a section corresponding to FIG. 2, with a module according to a second embodiment.

The embodiment according to FIG. 3 corresponds substantially to the one shown in FIG. 2, with the difference that the electrical contact element 18 is connected to the edge 20 or to the (not shown) edge 32 by means of a welding or brazing connection 40, a riveted or screwed connection 42, as is illustrated in the alternative detail shown in FIG. 3, or by crimping, clinching or clamping.

In this embodiment, the glued connection 30' is designed to be electrically non-conductive. For making contact with the vehicle body 1, the plug 24 has a separate cable 31 or a wire of the flat cable with a plug contact end 33, which is attached to the edge 32 and clamped in place. The cable 31 is connected with the cable guided to the edge 20 or with this wire within the plug 24. Leading away from plug 24 is a cable that is guided to a power source 35. By this embodiment, the consumer 26 is both connected to ground and to a power source, and at the same time there is achieved the ground contacting of part 14.

As an alternative to the glued connection 30', there may also be provided another type of connection. In the following embodiments, there is likewise shown the plug contact 24, but the power source 35 is not illustrated any more, for the sake of simplification.

Figure 4:
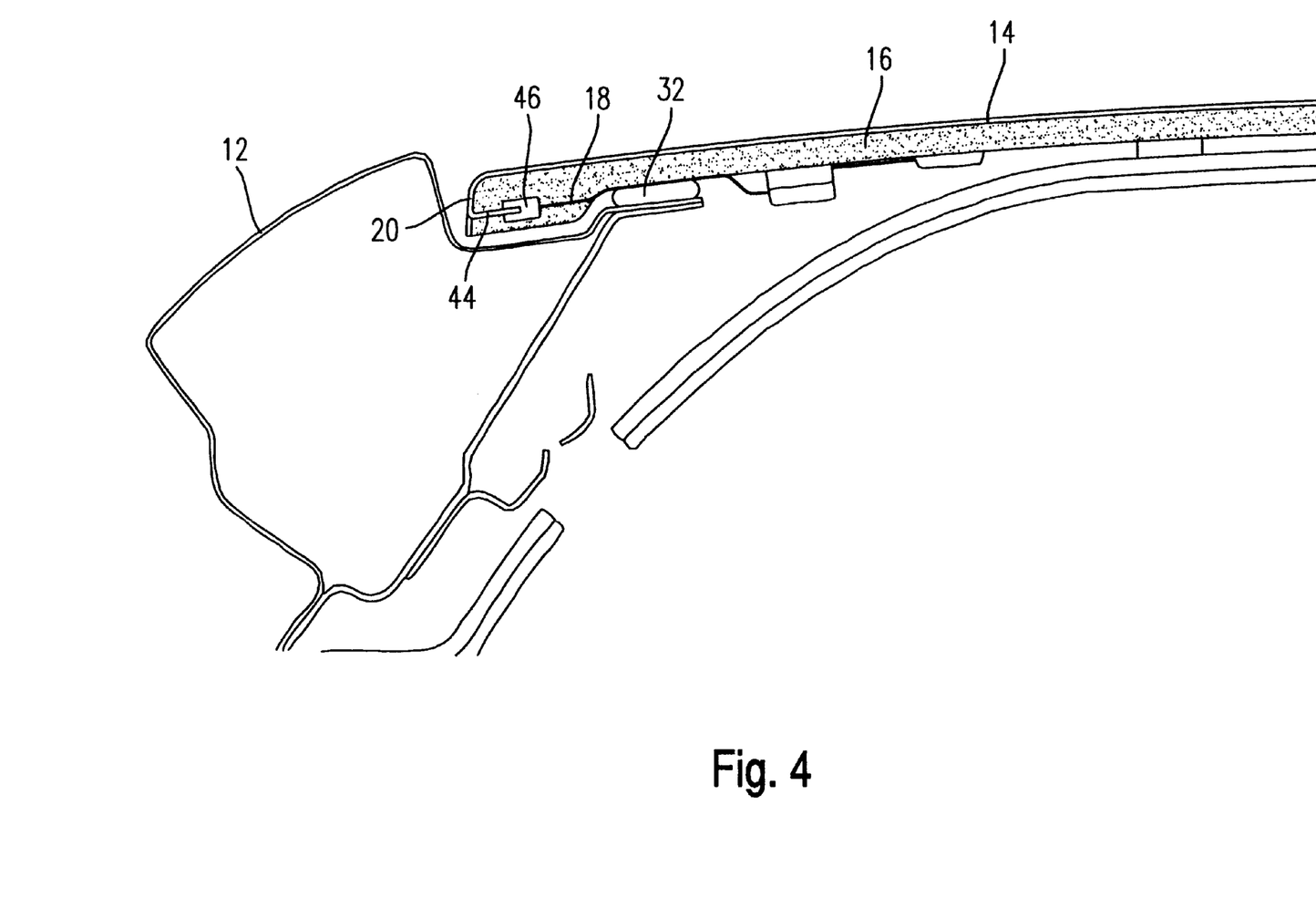
FIG. 4 shows a section corresponding to FIG. 2, with a module according to a third embodiment.

In the embodiment according to FIG. 4, there protrudes a sheet metal lug 44 from the inner side of edge 20, extending into the plastic material, with a plug contact 46—which is provided on the free end of the contact element 18—being slipped on this lug prior to the sheet metal 14 being provided with a backing by way of foaming or injection-molding.

Figure 5:
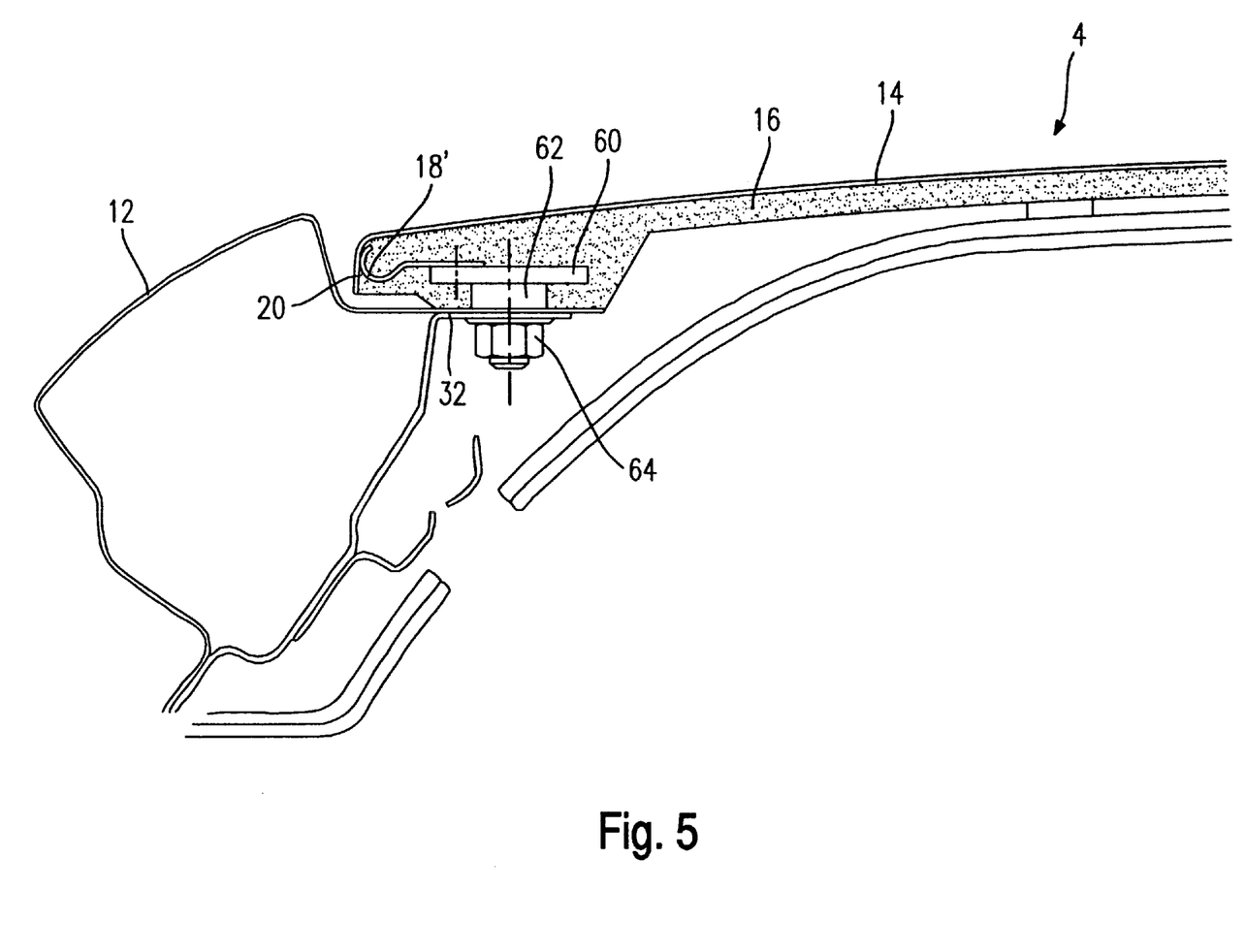
FIG. 5 shows a section corresponding to FIG. 2, with a module according to a fourth embodiment.

In the embodiment according to FIG. 5, the contact element 18' is realized in several pieces and comprises a contact spring that is embedded in the plastic layer 16 and has a free end bent in the shape of a semicircle. With this bent free end, the contact spring slightly presses against the inner side of the edge 20 of sheet metal 14, in order to ensure an electrical contact. The contact element 18' is screwed to a holding plate 60 or is connected therewith in any other way, with provision of an electrical contact, of course. Fastened on the underside of holding plate 60 is a screw bolt 62 which protrudes through an opening in edge 32. By means of a nut 64, the holding plate 60, completely embedded in the plastic layer 16, and hence the entire module 4, is fastened to the vehicle body 1. In the embodiment according to FIG. 5, the contact element 18' not only consists of the contact spring, but also of the holding plate 60 and the screw bolt 62 which is formed to have a shoulder terminating at the outer side of the plastic layer 16. So the contact element includes a nut-and-bolt connection, among the contact spring and the holding plate 60. Of course, there are arranged numerous fastening devices (nut and-bolt connections) distributed across the edge of the module. The fastening device shown serves, just like in the other embodiments, for arresting the module 4 and providing an electrical contact between sheet metal 14 and vehicle body 1.

Instead of the nut-and-bolt connection, there may be provided, if appropriate, a clamping or latching connection, as long as the electrical contact is ensured through his connection.

Figure 6:
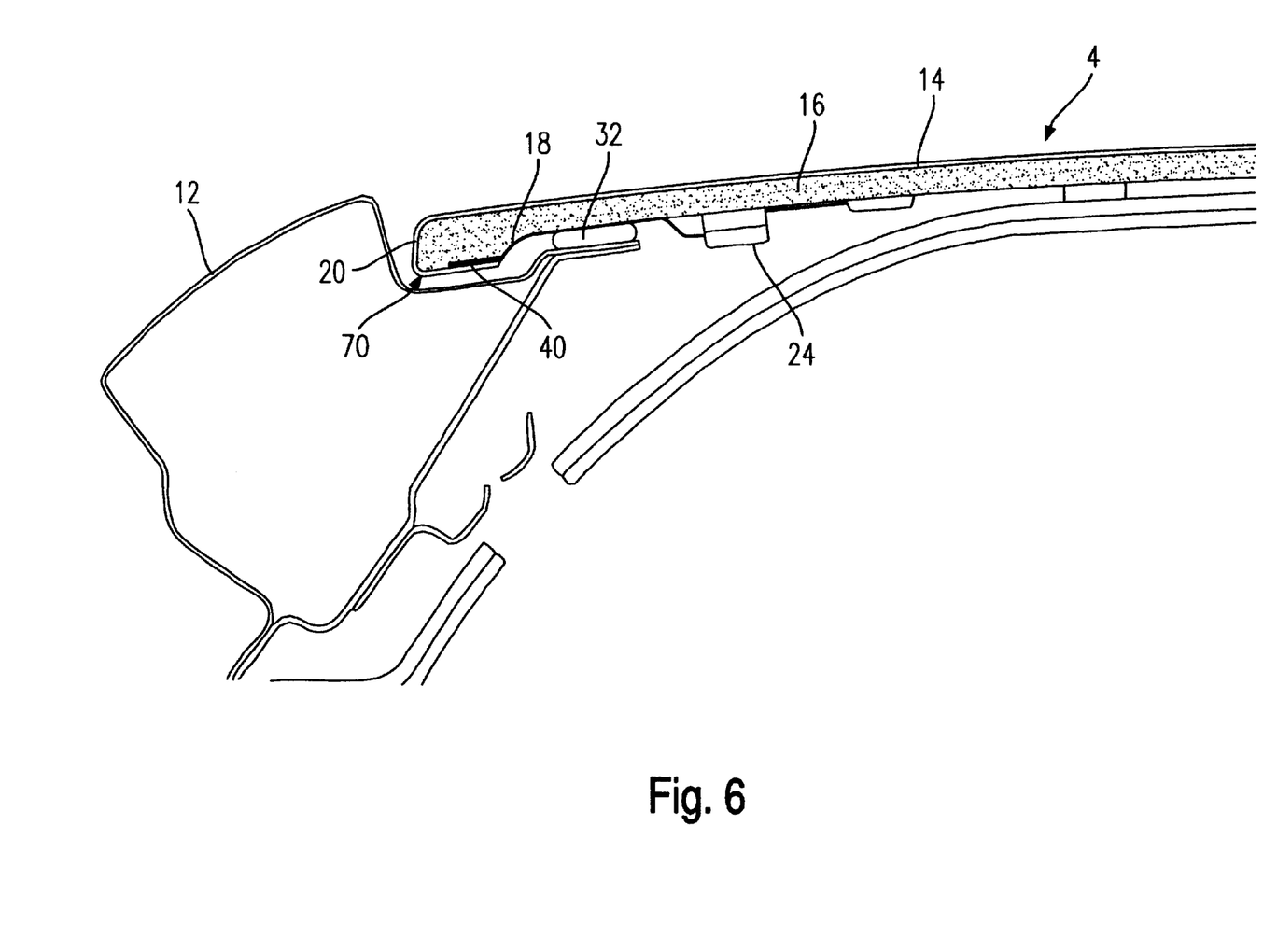
FIG. 6 shows a section corresponding to FIG. 2, with a module according to a fifth embodiment.

In the embodiment according to FIG. 6, a narrow tab 70 protrudes from the edge 20 towards the inside, which is somewhat wider than the contact element 18. The contact element 18 is fastened at its free end to the tab 70 by means of an electrically conductive glued connection 40. In this embodiment, the contact element 18 does not extend in sections in the plastic layer 16, i.e. it is not surrounded by plastic material on all sides, but it rather is exposed on the outer side of the plastic layer 16. The plastic layer 16 forms, so to speak, a U-shaped recess adapted to the shape of the contact element 18, the latter lying embedded in this recess.

In each of the embodiments shown of the module according to the invention, the plastic layer 16 preferably is produced by means of foaming. In all embodiments, the sheet metal 14 does not directly rest at the vehicle body 1, but rather the module rests at the vehicle body 1 via its plastic layer 16. The contact between the sheet metal 14 and the vehicle body 1 is achieved only by interposing the contact element 18, 18'. As shown in the embodiments according to FIGS. 2 and 4 through 6, the module 4 is fastened to the vehicle body 1 by means of that fastening device which also makes electrical contact with the electrical contact element and the vehicle body 1.

Figure 7:
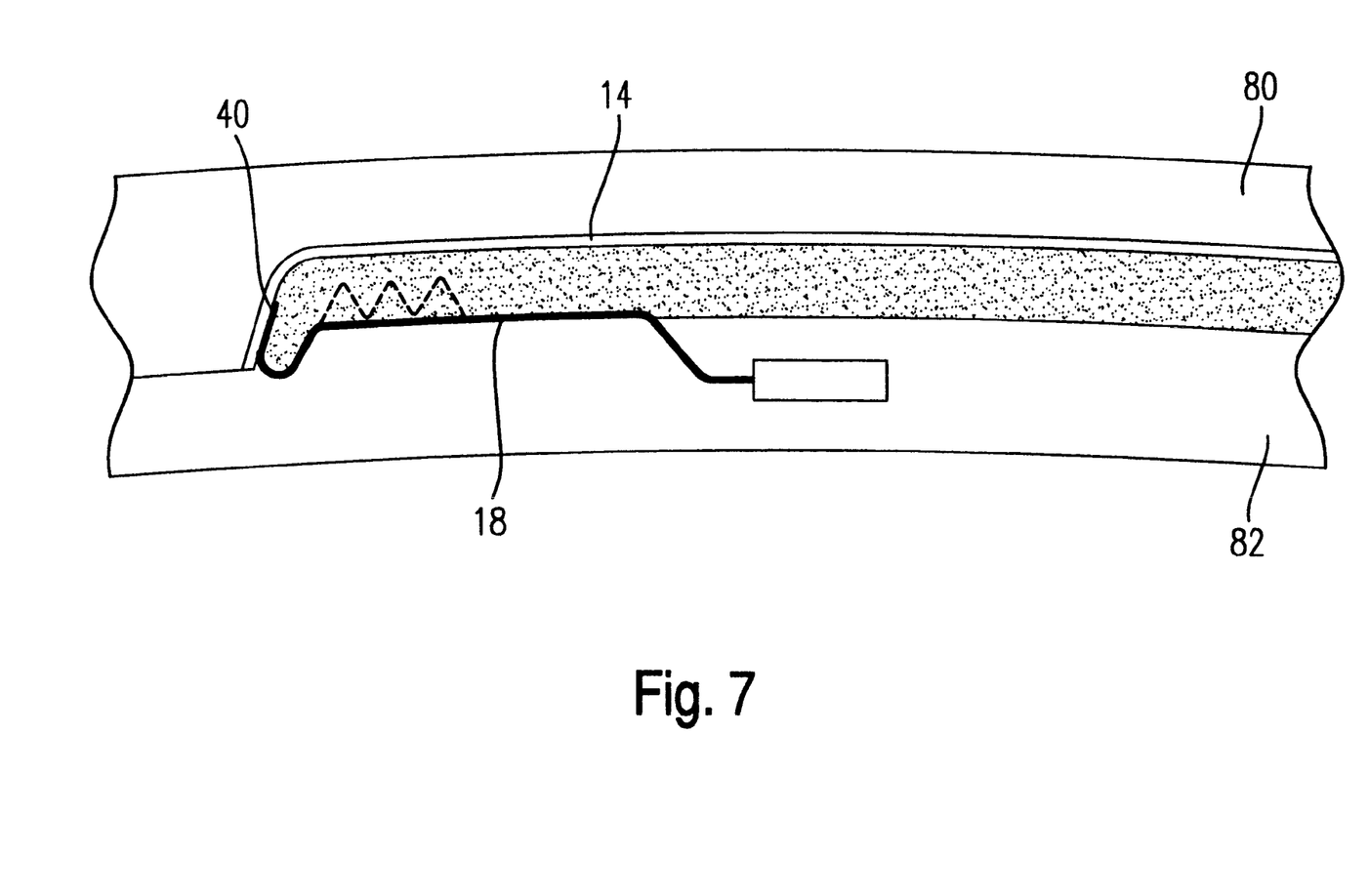
FIG. 7 shows a section through a foaming mold for producing the module according to the invention and carrying out the method according to the invention.

In FIG. 7 there is shown the foaming mold consisting of two halves 80, 82, which serves for producing the module 4. Prior to inserting sheet metal 14 in the foaming mold half 80, the contact element 18 is fastened to sheet metal 14 via the glued connection 40. Then, the part (i.e. the sheet metal 14) is placed in the foaming mold. The contact element 18 is also placed in the foaming mold and is positioned relative to sheet metal 14, i.e., by laying the contact element 18 directly on the foaming mold half 82 or by providing appropriate retaining elements in the foaming mold halves 80, 82, for instance sliders. The contact element 18 is provided so as to extend out of the foaming mold by it being guided through flexible plastic sealings at the edge of the foaming mold halves 80, 82 and being clamped between the sealings, thereby positioning it. Subsequently, the sheet metal 14 is provided with a foamed backing in such a way that the contact element 18 is embedded in the plastic layer 16 being produced. For achieving a strain-relief, the preferably flexibly configured electrical contact element 18 may extend in an undulated shape or, as is shown in FIG. 7 in broken lines, also zigzag-like in the plastic layer 16.

The aforementioned description is exemplary rather that limiting. Many modifications and variations of the present invention are possible in light of the above teachings. The preferred embodiments of this invention have been disclosed. However, one of ordinary skill in the art would recognize that certain modifications would come within the scope of this invention. Hence, within the scope of the appended claims, the invention may be practiced otherwise than as specifically described. For this reason the following claims should be studied to determine the true scope and content of this invention.

We claim:

1. A module for mounting on a vehicle body, comprising:
   at least one metal part that forms at least a portion of a vehicle body's outer skin;
   a plastic layer which is connected with said at least one metal part;
   an electrically conductive contact element connected with said at least one metal part in an electrically conductive manner and attached to said plastic layer; and
   said contact element having a section for providing an electrical contact, said section being exposed with regard to said plastic layer.

2. The module according to claim 1, wherein said metal part is a sheet metal part that closes an opening in said vehicle body's outer skin.

3. The module according to claim 1, wherein said metal part is a supporting frame.

4. The module according to claim 1, wherein said at least one metal part comprises at least a portion of a roof.

5. The module according to claim 4, wherein said roof comprises at least one of a sliding roof and a spoiler roof.

6. The module according to claim 1, wherein said contact element is connected in an electrically conductive manner with one of said metal part and a vehicle body.

7. The module according to claim 6, wherein said contact element is attached to one of said metal part and said vehicle body by at least one of an electrically conductive glued connection, welding, brazing, riveting, crimping, clinching, an electrical plug-in contact, screwing and clamping.

8. The module according to claim 1, wherein a fastening device is provided for fastening said module to said vehicle body, said fastening device being at least one of a glued connection, a riveted connection, a crimped connection, a clinched connection, a plug-in connection, a screwed connection and a clamped connection.

9. The module according to claim 8, wherein said fastening device for fastening said module to said vehicle body also fastens said contact element to said vehicle body in an electrically conductive manner.

10. The module according to claim 9, wherein said fastening device comprises an electrically conductive glued connection.

11. The module according to claim 1, wherein said metal part has an underside having a foamed backing to form said plastic layer.

12. The module according to claim 1, wherein said contact element is a cable.

13. The module according to claim 12, wherein said cable is embedded in said plastic layer.

14. The module according to claim 12, wherein said cable is exposed on an outer side of said plastic layer and fastened to said plastic layer.

15. The module according to claim 12, including an electrical consumer, said cable having an end connected with a plug, said plug electrically connecting said electrical consumer.

16. The module according to claim 15, wherein said cable has conductors leading away from said plug and guided to a power source.

17. The module according to claim 12, wherein said cable is embedded in said plastic layer at least in one of an undulated and zigzag-like manner.

18. The module according to claim 1, wherein said contact element comprises a nut-and-bolt connection and one of a nut and a bolt of said nut-and-bolt connection is embedded in said plastic layer by means of foamings.

19. The module according to claim 18, wherein said electrical contact element comprises a contact spring resting at said metal part and embedded in said plastic layer by means of foaming.

20. A method of fastening a module to a vehicle body said module being for mounting on a vehicle body and closing an outer skin of said vehicle body, said module comprising at least one part made of metal that forms at least a portion of said outer skin and a plastic layer which is connected with said metal part and with which said module rests at said vehicle body, an electrically conductive contact element that is connected with said metal part in an electrically conductive manner and that is attached to said plastic layer, said contact element having a section for providing an electrical contact with said vehicle body, said section being exposed with regard to said plastic layer, said plastic layer being produced by means of foaming, said method comprising the step of:
   contacting said module and said vehicle body only in a region of said plastic layer;
   providing a fastening device; and
   fastening said plastic layer to said vehicle body and said module via said plastic layer to said vehicle body, said electrical contact element also being connected in an electrically conductive manner to said vehicle body by the same fastening device.

21. The method according to claim 20, wherein an electrically conductive glued connection is used as said fastening device and said glued connection extends both across said plastic layer and said contact element.

* * * * *